United States Patent
Janky et al.

(10) Patent No.: US 7,266,445 B1
(45) Date of Patent: *Sep. 4, 2007

(54) METHOD AND A SYSTEM FOR NAVIGATING AROUND REAL SITE BY CREATING AND ACCESSING DATABASE OF POSITIONAL REALITY IMAGES OF REAL SITE

(75) Inventors: James M. Janky, Los Altos, CA (US); Kurtis L. Maynard, Gainesville, GA (US)

(73) Assignee: Trimble Navigation Ltd, Sunnyvale, CA (US)

( * ) Notice: Subject to any disclaimer, the term of this patent is extended or adjusted under 35 U.S.C. 154(b) by 614 days.

This patent is subject to a terminal disclaimer.

(21) Appl. No.: 10/713,596

(22) Filed: Nov. 13, 2003

Related U.S. Application Data

(63) Continuation-in-part of application No. 09/369,033, filed on Aug. 4, 1999, now Pat. No. 6,677,938.

(51) Int. Cl.
*G01C 21/00* (2006.01)

(52) U.S. Cl. .................... 701/207; 701/211; 345/419; 715/850

(58) Field of Classification Search ................ 701/208, 701/207
See application file for complete search history.

(56) References Cited

U.S. PATENT DOCUMENTS 5,546,188 A    8/1996    Wangler et al.
5,644,318 A    7/1997    Janky et al.
5,719,664 A    2/1998    Besesty et al.
6,185,265 B1*   2/2001    Campanella ................ 375/341
6,201,798 B1*   3/2001    Campanella et al. ....... 370/326
6,677,938 B1*   1/2004    Maynard .................... 345/419

OTHER PUBLICATIONS

Foresti et al., A vision-based system for autonomous underwater vehicle navigation, IEEE, vol. 1, Sep. 28-Oct. 1, 1998 pp. 195-199 vol. 1.*
Baten et al., Techniques tor autonomous, off-road navigation, IEEE, vol. 13, Issue 6, Nov.-Dec. 1998 pp. 57-65.*

(Continued)

*Primary Examiner*—Thomas Black
*Assistant Examiner*—McDieunel Marc
(74) *Attorney, Agent, or Firm*—Boris G. Tankhilevich

(57) ABSTRACT

A method and a system for navigating a vehicle around a real site. The method comprises the following steps: (A) creating a database of Positional Reality Images (PRI) that substantially accurately represents the real site, and (B) accessing the database of Positional Reality Images (PRI) that substantially accurately represents the real site in order to navigate a vehicle around said real site. The integrated Positional Reality System (PRS) comprising a positioning system integrated with a plurality of optical systems is used to create the database of Positional Reality Images (PRI) that substantially accurately represents the real site. The PRS utilizes a laser-diode-based optical scanning system if a range between the PRS and a selected real site object comprises a short range distance and a pulse-type-microlaser-based optical system if a range between the PRS and a selected real site object comprises a short-to-medium range distance.

24 Claims, 8 Drawing Sheets

OTHER PUBLICATIONS

Olin et al., Autonomous cross-country navigation: an integrated perception and planning system, IEEE, vol. 6, Issue 4, Aug. 1991 pp. 16-30.*

Satoh et al., Autonomous mobile patrol system for nuclear power plants: field test report of vehicle navigation and sensor positioning, IEEE, vol. 2, Nov. 4-8, 1996 pp. 743-750 vol. 2.*

* cited by examiner

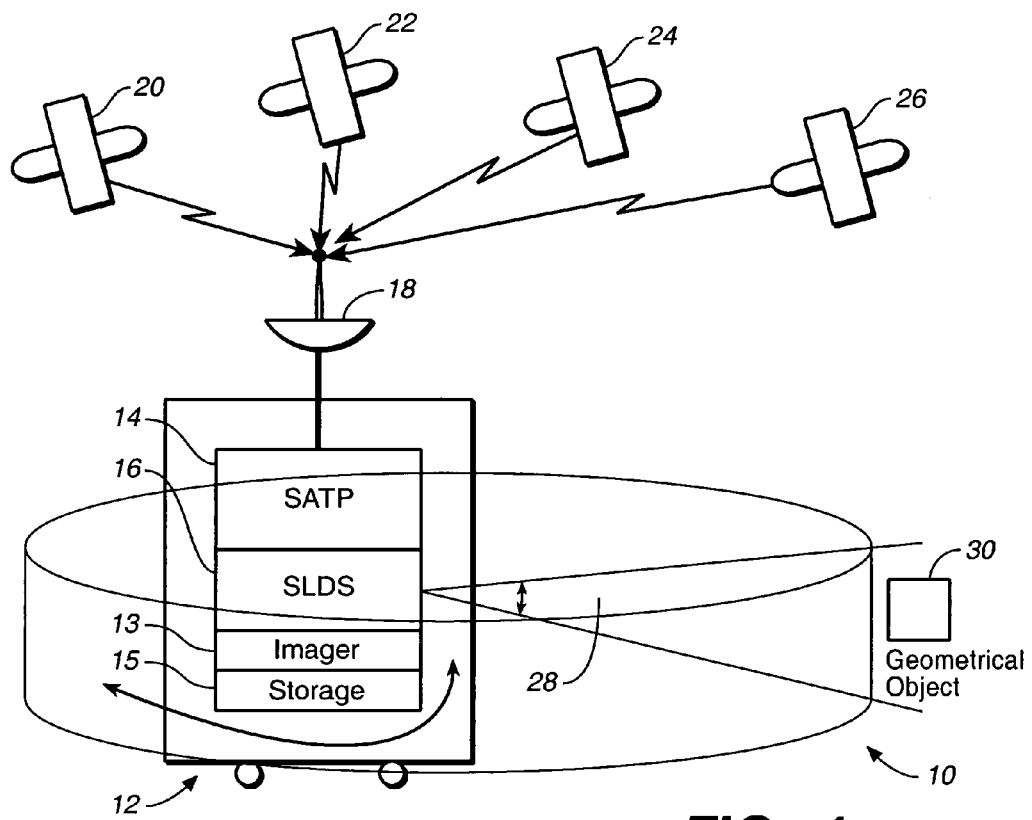
FIG._1
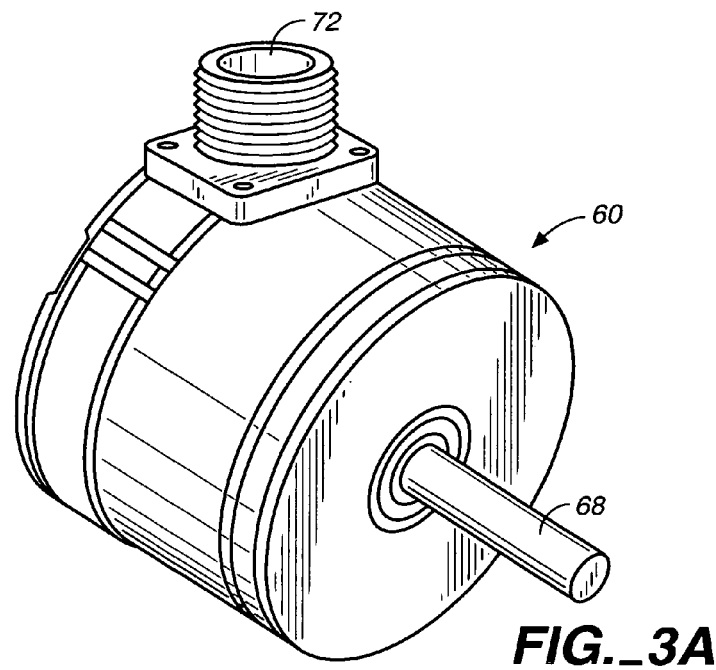
FIG._3A

A-743cip/Tank-157cip
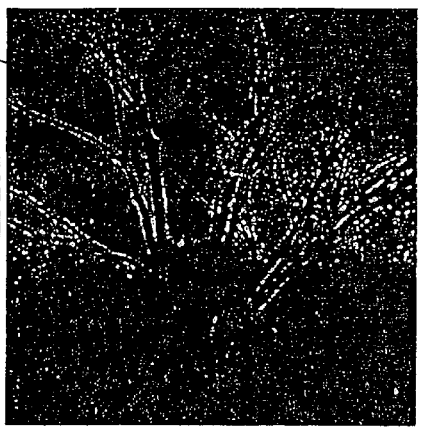
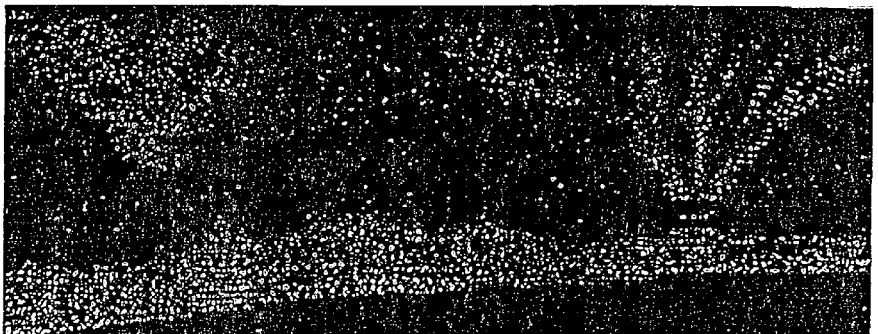
Passing the GPS / Laser System Creates the Bottom Image. Every Dot on the Image has a Latitude, Longitude and Height. This Image was Created with 3 Seconds of Data Traveling at 40 mph.
FIG._2

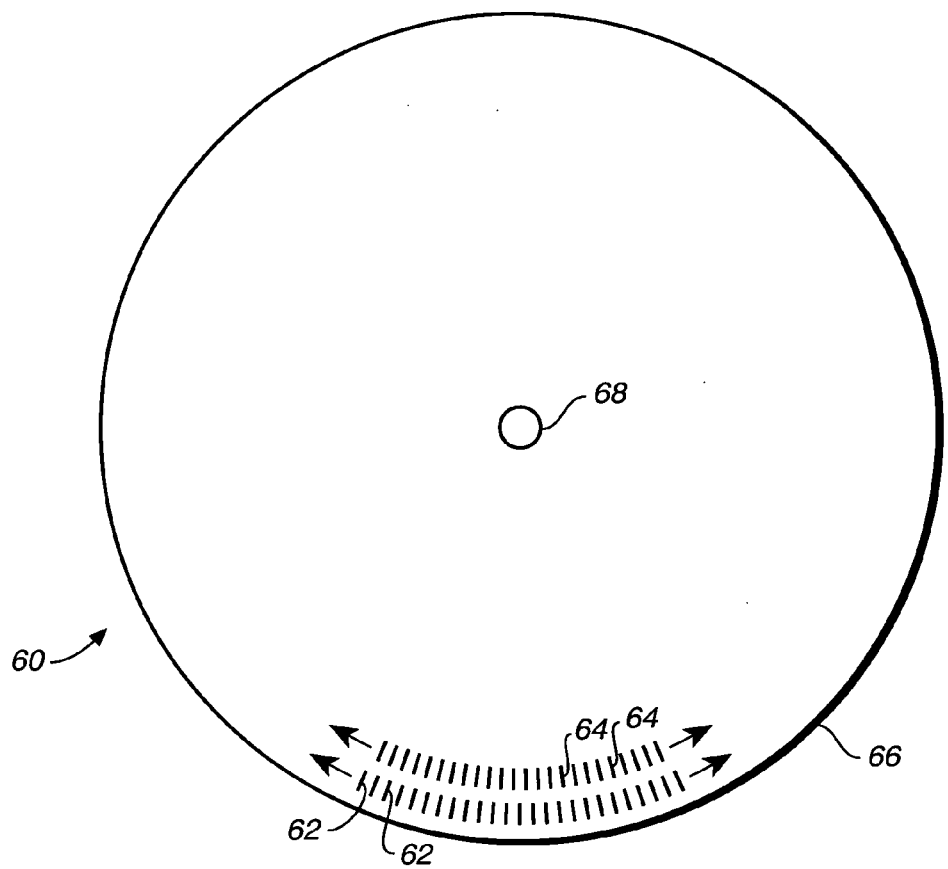
FIG._3
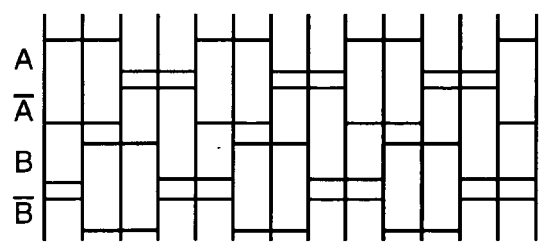
FIG._4

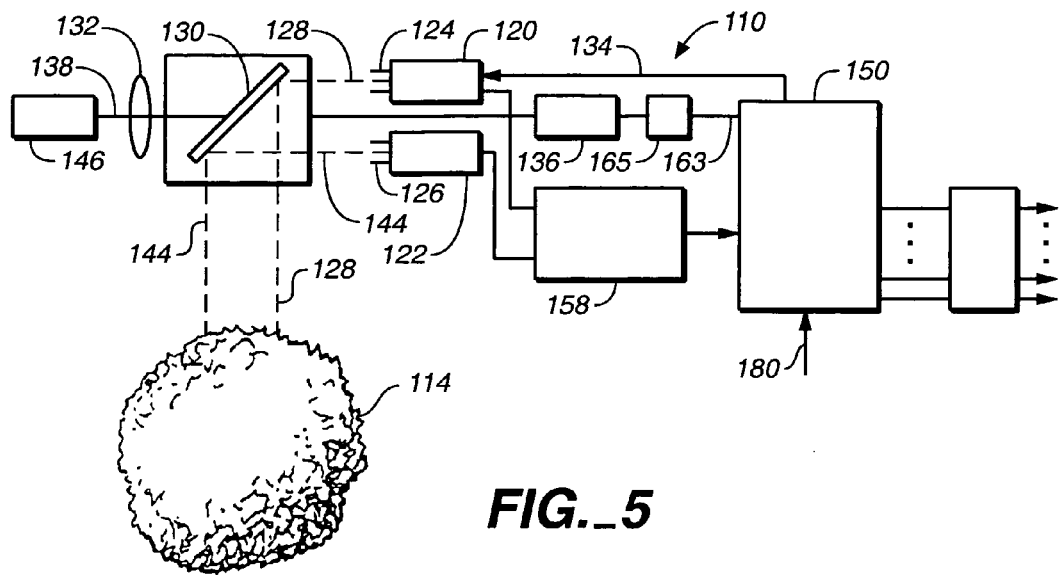
FIG._5
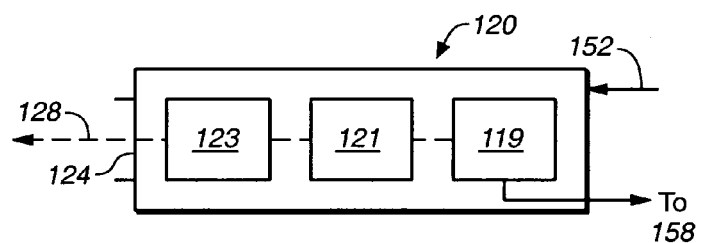
FIG._5A
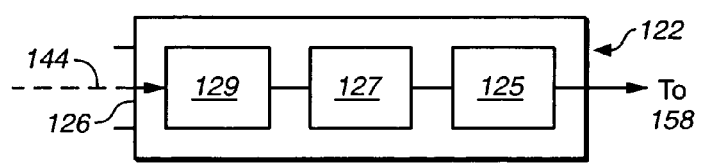
FIG._5B

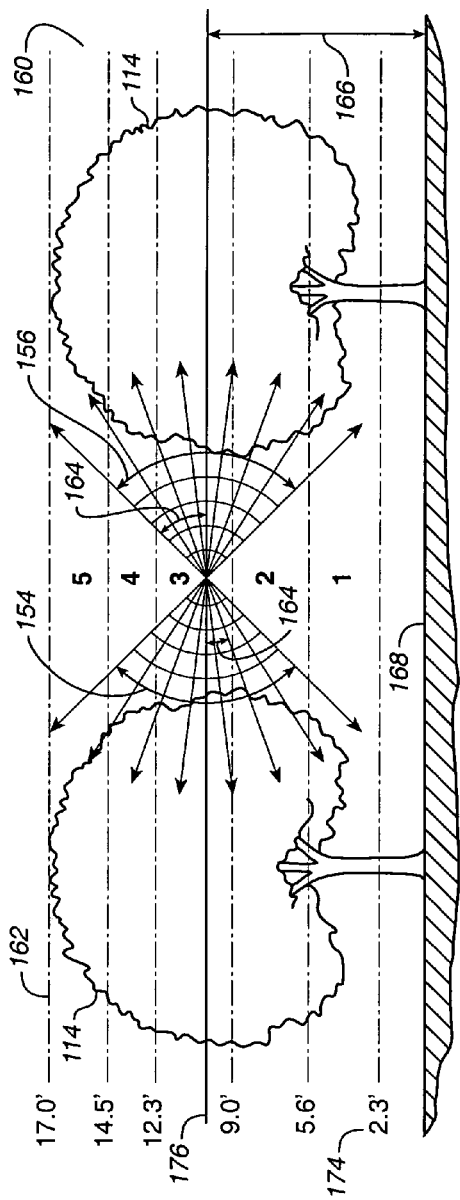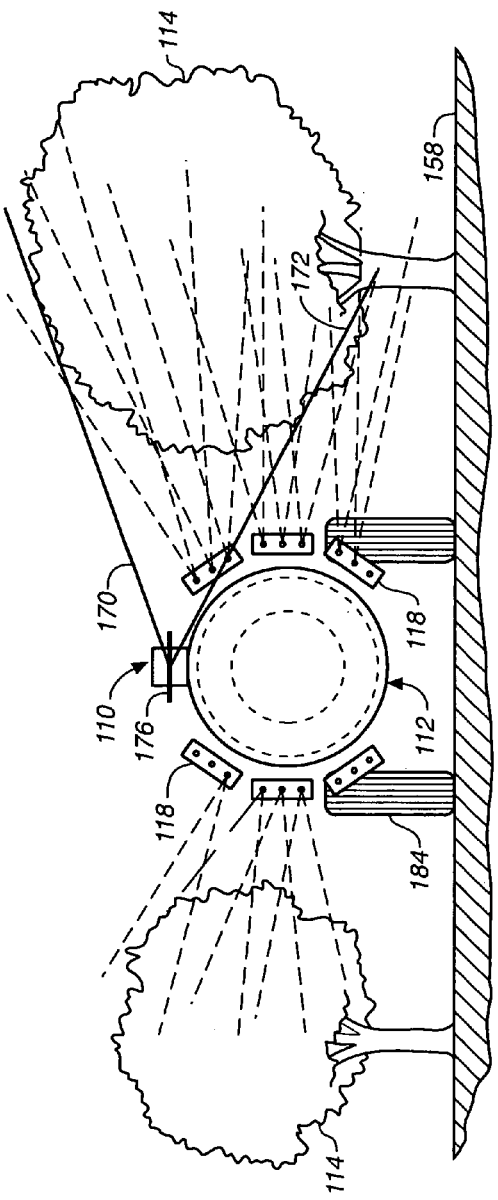
FIG._6
FIG._7

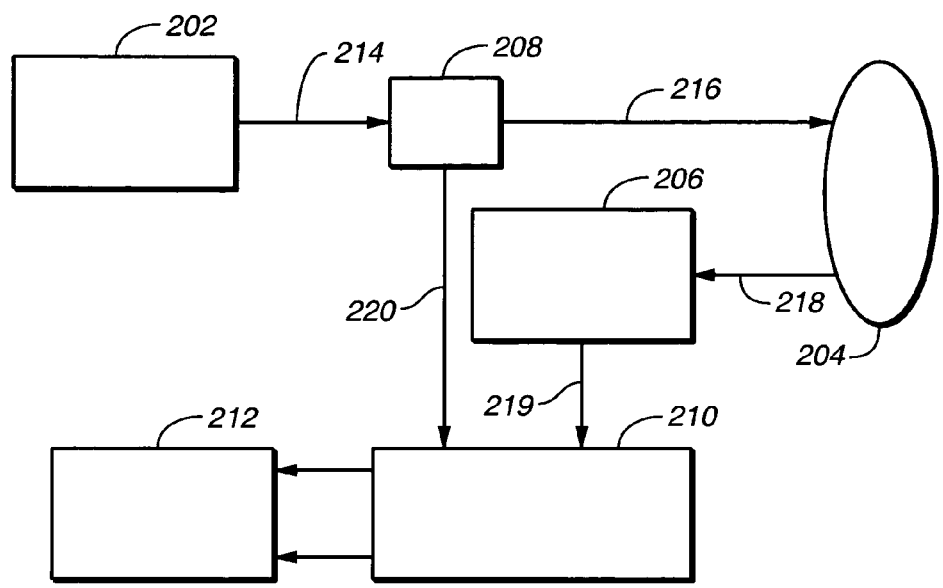
FIG._8
(PRIOR ART)
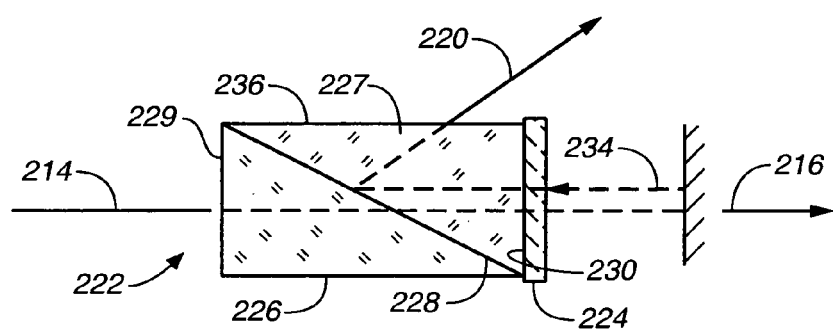
FIG._9
(PRIOR ART)

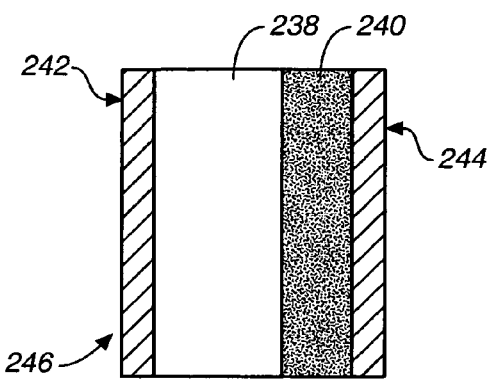
FIG._10A
(PRIOR ART)
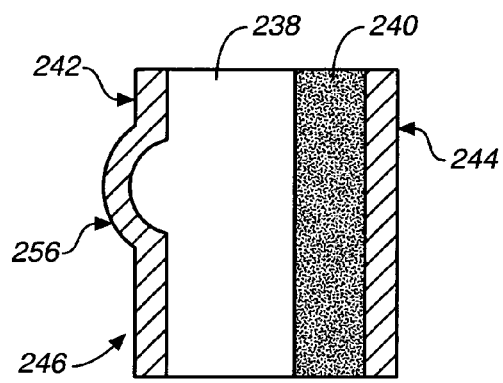
FIG._10B
(PRIOR ART)
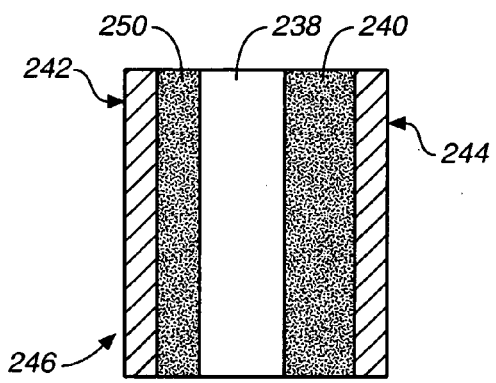
FIG._11A
(PRIOR ART)
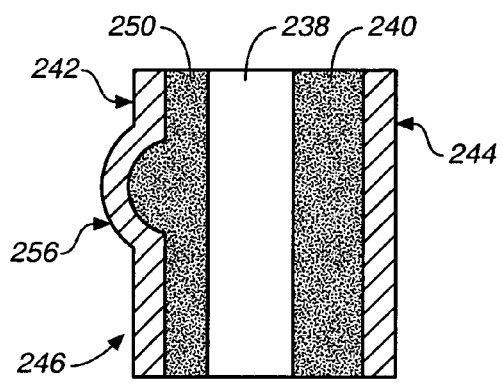
FIG._11B
(PRIOR ART)

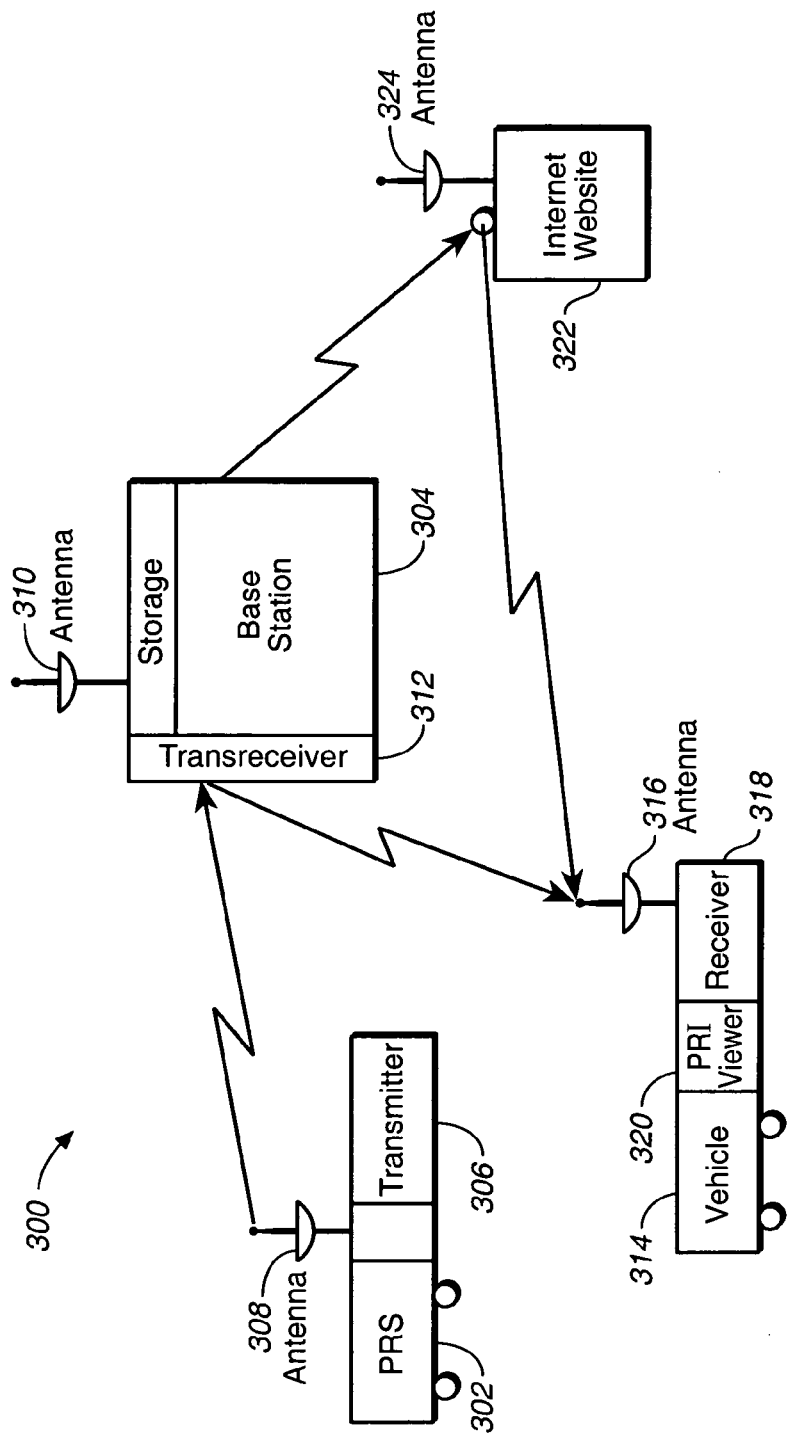
FIG._12

METHOD AND A SYSTEM FOR NAVIGATING AROUND REAL SITE BY CREATING AND ACCESSING DATABASE OF POSITIONAL REALITY IMAGES OF REAL SITE

This is a continuation-in-part of the U.S. patent application entitled "GENERATING POSITIONAL REALITY USING RTK GPS INTEGRATED WITH SCANNING LASERS", Ser. No. 09/369,033, filed on Aug. 4, 1999. Now U.S. Pat. No. 6,677,938.

FIELD OF THE INVENTION

The present invention is in the field of the RTK GPS integrated with scanning lasers. More specifically, the present invention relates to the field of blind vehicle navigation by using positional reality images of real site.

DISCUSSION OF THE PRIOR ART

Computer games and simulators have introduced the term "Virtual Reality" to our vocabularies. Virtual Reality is the concept of viewing scenes in three dimensions giving the viewer the feeling of being in the scene. Many of the Virtual Reality Scenarios are done with imagery, with no dimensional or positional integrity.

On the other hand, in a real time simulator, the dimensional or positional integrity of an image can become very important. Indeed, if a simulator's job is to simulate driving the Indy 500, then the track, wall locations etc. need to have the correct dimensions. The same is true if you want to play a simulated hole of Golf at Augusta, you would like the fairways and greens to have the look and feel of the real Golf Course.

Conventional survey techniques as well as Real Time Kinematic Global Positioning System (RTK GPS) surveys are unable to provide in a cost-effective manner information necessary to build images of a real object with positional integrity.

In the parent patent application "GENERATING POSITIONAL REALITY USING RTK GPS INTEGRATED WITH SCANNING LASERS", Ser. No. 09/369,033, and filed on Aug. 4, 1999, a method and a system for creating a Positional Reality scene of a plurality of real objects that represents a virtual reality scene with the correct positional information about real objects are disclosed. The parent patent application Ser. No. 09/369,033, employs an integrated Positioning Reality System (PRS) comprising a Satellite Positional System (SATPS) and a single optical system including a laser diode. However, the laser diodes are good for measuring short distances less than 100 meters. On the other hand, the real objects of a real site might be located at various distances from the Positioning Reality System (PRS).

What is needed is a method and a system for creating a database of Positional Reality Images (PRI) that substantially accurately represents a real site.

SUMMARY OF THE INVENTION

To address the shortcomings of the available art, the present invention provides a method and a system for navigating around a real site by creating and accessing a database of Positional Reality Images (PRI) that substantially accurately represents the real site.

One aspect of the present invention is directed to a method for navigating around a real site. In one embodiment of the present invention, the method comprises the following steps of: (A) creating a database of Positional Reality Images (PRI) that substantially accurately represents the real site; and (B) accessing the database of Positional Reality Images (PRI) in order to navigate the vehicle around the real site. The real site comprises at least one three dimensional real geometrical object, and each Positional Reality Image (PRI) substantially accurately represents at least one three dimensional real geometrical object of the real site.

In one embodiment of the present invention, the step (A) of creating the database of Positional Reality Images (PRI) that substantially accurately represents the real site further includes the step (A1) of employing an integrated Positional Reality System (PRS) configured to create the database of Positional Reality Images (PRI) that substantially accurately represents the real site, whereas the integrated Positional Reality System (PRS) comprises a positioning system integrated with a plurality of optical systems.

In one embodiment of the present invention, the step (A1) of employing the integrated Positional Reality System (PRS) to create the database of Positional Reality Images (PRI) that substantially accurately represents the real site further comprises the following steps: (A1,1) selecting a real site object; (A1,2) estimating a range from the PRS to the selected real site object; (A1,3) selecting an optimum optical system; (A1,4) generating a Positional Reality Image (PRI) of the selected real site object; and (A1,5) repeating steps ((A1,1)-(A1,4)) in order to create a database comprising a substantially complete set of Positional Reality Images (PRIs) of the real site.

In one embodiment of the present invention, the step (A1,3) of selecting the optimum optical system further includes the steps of: selecting a laser-diode-based optical scanning system if a range between the PRS and the real site object comprises a short range distance; and selecting a pulse-type-microlaser-based optical system if the range between the PRS and the real site object comprises a short-to-medium range distance.

In one embodiment of the present invention, the step (B) of accessing the database of Positional Reality Images (PRI) that accurately represents the real site in order to navigate the vehicle around the real site further comprises the step of (B1,1) viewing the database comprising the substantially complete set of Positional Reality Images of the real site. In one embodiment of the present invention, the vehicle equipped with the PRS can navigate around the real site by viewing the database comprising the substantially complete set of Positional Reality Images of the real site. In another embodiment of the present invention, the vehicle equipped with the PRS can navigate in real time around the real site by viewing the database comprising the substantially complete set of Positional Reality Images of the real site. In one more embodiment of the present invention, the vehicle equipped with the PRS can navigate around the real site in complete darkness by viewing the database comprising the substantially complete set of Positional Reality Images of the real site.

Another aspect of the present invention is directed to a method for navigating around a real site by accessing the previously created database of Positional Reality Images (PRI) that substantially accurately represents the real site.

In one embodiment of the present invention, the method comprises the following steps: (A) creating a database of Positional Reality Images (PRI) that substantially accurately represents the real site; (B) accessing the database of Positional Reality Images (PRI) in order to navigate the vehicle around the real site; (C) storing the database of Positional Reality Images (PRI) that substantially accurately represents the real site; (D) transmitting the database of Positional Reality Images (PRI) that substantially accurately represents the real site from the PRS system to a base station (BS); (E) transmitting the database of Positional Reality Images (PRI) that substantially accurately represents the real site from the base station (BS) into a vehicle; (F) viewing the database of Positional Reality Images (PRI) that substantially accurately represents the real site by an operator of the vehicle; and (G) navigating the vehicle around the real site by accessing the database of Positional Reality Images (PRI) that substantially accurately represents the real site.

In one embodiment of the present invention; the step (G) of navigating the vehicle around the real site by accessing the database of Positional Reality Images (PRI) that substantially accurately represents the real site further comprises the step (G1) of navigating the vehicle around the real site in complete darkness.

In one embodiment of the present invention, the method comprises the following steps: (A) creating a database of Positional Reality Images (PRI) that substantially accurately represents the real site; (B) accessing the database of Positional Reality Images (PRI) in order to navigate the vehicle around the real site; (C) storing the database of Positional Reality Images (PRI) that substantially accurately represents the real site; and (H) posting the database of Positional Reality Images (PRI) that substantially accurately represents the real site on an Internet web site, so that the vehicle can navigate around the real site by accessing the posted on the web site database of Positional Reality Images (PRI)) that substantially accurately represents the real site.

In one embodiment of the present invention, the method comprises the following steps: (A) creating a database of Positional Reality Images (PRI) that substantially accurately represents the real site; (B) accessing the database of Positional Reality Images (PRI) in order to navigate the vehicle around the real site; (C) storing the database of Positional Reality Images (PRI) that substantially accurately represents the real site; and (I) web casting the database of Positional Reality Images (PRI) that substantially accurately represents the real site from the Internet web site, so that the vehicle can navigate around the real site by accessing the posted on the web site database of Positional Reality Images (PRI)) that substantially accurately represents the real site.

One more aspect of the present invention is directed to an apparatus for navigating a vehicle around a real site.

In one embodiment of the present invention, the apparatus for navigating a vehicle around a real site comprises an integrated Positional Reality System (PRS) mounted on a moving platform. In this embodiment, the integrated Positional Reality System (PRS) further comprises: a positioning system, and a plurality of optical systems integrated with the positioning system. The Positional Reality System (PRS) is configured to create a plurality of Positional Reality Images (PRIs) of the real site, whereas each PRI image represents at least one real object located at the real site.

In one embodiment of the present invention, the plurality of optical systems integrated with the positioning system further comprises: a laser-diode-based optical scanning system configured to measure a short range distance between the PRS system and a real site object; and a pulse-type-microlaser-based optical system configured to measure a short-to-medium range distance between the PRS system and a real site object.

In one embodiment of the present invention, the apparatus for navigating a vehicle around a real site comprises an integrated Positional Reality System (PRS) mounted on a moving platform configured to create a plurality of Positional Reality Images (PRIs) of the real site and a see-through display configured to view the PRI images of the real site obtained by the PRS system. In another embodiment of the present invention, the apparatus for navigating a vehicle around a real site comprises an integrated Positional Reality System (PRS) mounted on a moving platform configured to create a plurality of Positional Reality Images (PRIs) of the real site and a telemonitor configured to view the PRI images of the real site obtained by the PRS system. In one more embodiment of the present invention, the apparatus for navigating a vehicle around a real site comprises an integrated Positional Reality System (PRS) mounted on a moving platform configured to create a plurality of Positional Reality Images (PRIs) of the real site and a storage means configured to store a database of PRI images of the real obtained by the PRS system. Yet, in another embodiment of the present invention, the apparatus for navigating a vehicle around a real site comprises an integrated Positional Reality System (PRS) mounted on a moving platform configured to create a plurality of Positional Reality Images (PRIs) of the real site and a transceiver configured to wirelessly transmit the database of PRI images of the real site obtained by the PRS system to the base station (BS).

In one embodiment of the present invention, the system for navigating a vehicle around a real site comprises an integrated Positional Reality System (PRS) mounted on a moving platform configured to create a database comprising a plurality of Positional Reality Images (PRIs) of the real site, a base station (BS) configured to receive the database comprising a plurality of Positional Reality Images (PRIs) of the real site, a transceiver mounted on a vehicle and configured to wirelessly receive the database of PRI images of the real site from the base station (BS), and a virtual controller configured to get access to the database of the set of PRI images of the real site in order to navigate the vehicle around the real site.

In one embodiment of the present invention, the system for navigating a vehicle around a real site comprises an integrated Positional Reality System (PRS) mounted on a moving platform configured to create a database comprising a plurality of Positional Reality Images (PRIs) of the real site, and configured to post the database comprising a plurality of Positional Reality Images (PRIs) of the real site on the web site, a transceiver mounted on a vehicle and configured to wirelessly receive the database of PRI images of the real site from the web site, and a virtual controller configured to get access to the database of the set of PRI images of the real site in order to navigate the vehicle around the real site.

The positioning system is selected from the group consisting of: {a Satellite Positioning System (SATPS); a GALILEO system; a GPS system; a differential DGPS system; a real time kinematic RTK GPS system; a combined GLONASS/GPS system; a combined GALILEO/GPS system; an inertial navigation system (INS); and a pseudolite navigation system}.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts an apparatus of the present invention for navigating a vehicle around a real site comprising an integrated Positional Reality System (PRS) mounted on a moving platform.

FIG. 2 shows an example of data obtained using the Positional Reality System (PRS) of FIG. 1.

FIG. 3 illustrates a disk internal to the rotary encoder.

FIG. 3A depicts a rotary encoder including a shaft and an output terminal.

FIG. 4 shows the typical outputs for the rotary encoder of FIGS. 3 and 3A.

FIG. 5 depicts a schematic diagram of the Scanning Laser Diode Sensor (SLDS).

FIG. 5A shows a schematic diagram of the laser transmitter illustrating the relationship between the laser device and the lens/prism system.

FIG. 5B is a schematic diagram of the optical receiver illustrating the relationship of the receiving objective lens and the photodiode converting the optical signal to current pulses.

FIG. 6 illustrates how to determine the geometrical relationship between the SLDS of FIG. 5 and the target object.

FIG. 7 shows how to determine the range to the top and to the bottom of the target object using the SLDS of FIG. 5.

FIG. 8 is a prior art diagram illustrating the essential components of a telemetry device including the pulse-type microlaser of '664 patent.

FIG. 9 depicts a prior art device for splitting a light beam from the microlaser into a main beam and a secondary beam.

FIGS. (10A-11B) illustrate the four embodiments of the laser cavity used to build the prior art microlaser of '664 patent.

FIG. 12 shows the PRS system of the present invention configured to obtain the PRI database of a real site, a Base Station configured to receive this PRI database from the PRS system, to store it, and to transmit to the vehicle that can navigate the real site by viewing the transmitted PRI database of the real site in complete darkness.

FULL DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

In one embodiment of the present invention, as depicted in FIG. 1, the apparatus for navigating a vehicle around a real site 10 comprises an integrated Positional Reality System (PRS) mounted on a moving platform 12.

In one embodiment of the present invention, the integrated Positional Reality System (PRS) further comprises: a positioning system, and a plurality of optical systems integrated with the positioning system. The Positional Reality System (PRS) is configured to create a plurality of Positional Reality Images (PRIs) of the real site, whereas each PRI image represents at least one real object located at the real site.

In one embodiment of the present invention, the plurality of optical systems integrated with the positioning system further comprises: a laser-diode-based optical scanning system configured to measure a short range distance between the PRS system and a real site object; and a pulse-type-microlaser-based optical system configured to measure a short-to-medium range distance between the PRS system and a real site object.

In one embodiment of the present invention, FIG. 1 depicts an integrated Positional Reality System (PRS) system 10 of the present invention comprising a positioning system integrated with a laser-diode-based optical scanning system configured to measure a short range distance between the PRS system and a real site object 30.

In one embodiment of the present invention, more specifically, the laser-diode-based optical scanning system configured to measure a short range distance between the PRS system and the real site object 30 comprises a Scanning Laser Diode Sensor (SLDS) 16 configured to generate a Positional Reality Image (PRI) of the geometrical object 30. The positioning system can be selected from the group consisting of: {a Satellite Positioning System (SATPS); a GALILEO system; a GPS system; a differential DGPS system; a real time kinematic RTK GPS system; a combined GLONASS/GPS system; a combined GALILEO/GPS system; an inertial navigation system (INS); and a pseudolite navigation system}.

In one embodiment of the present invention, more specifically, FIG. 1 depicts an integrated Positional Reality System (PRS) system (10) comprising a Satellite Positioning System (SATPS) 14 integrated with a Scanning Laser Diode Sensor (SLDS) 16 in order to create a Positional Reality Image (PRI) of a geometrical object 30.

Reference to a Satellite Positioning System or SATPS herein refers to a Global Positioning System (GPS), to a Global Orbiting Navigation System GLONASS), and to any other compatible satellite-based system that provides information by which an observer's position and the time of observation can be determined, all of which meet the requirements of the present invention.

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 24 Earth orbiting satellites approximately uniformly dispersed around six circular orbits with four satellites each, the orbits being inclined at an angle of 55° relative to the equator and being separated from each other by multiples of 600 longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency f1=1575.42 MHz (approximately nineteen centimeter carrier wavelength) and an L2 signal having a frequency f2=1227.6 MHz (approximately twenty-four centimeter carrier wavelength). These two frequencies are integral multiplies f1=1,540 f0 and f2=1,200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes and accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k=(1, 2, . . . 24) is the channel or satellite number. These frequencies lie in two bands at 1.597-1.617 GHz (L1) and 1,240-1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals. Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range ($r_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite.

After the SATPS receiver determines the coordinates of the i-th SATPS satellite by demodulating the transmitted ephemeris parameters, the SATPS receiver can obtain the solution of the set of the simultaneous equations for its unknown coordinates ($x_0$, $y_0$, $z_0$) and for unknown time bias error (cb). The SATPS receiver can also determine velocity of a moving platform.

In one embodiment of the present invention, the positioning system comprises a Differential Global Positioning System (DGPS), which is a technique that significantly improves both the accuracy and the integrity of the Global Positioning System (GPS).

The differential GPS receiver can include: (a) a real time code differential GPS; (b) a post-processing differential GPS; (c) a real-time kinematic (RTK) differential GPS that includes a code and carrier RTK differential GPS receiver. The differential GPS receiver can obtain the differential corrections from different sources.

The differential GPS receiver can obtain the differential corrections from a Reference (Base) Station. The fixed Base Station (BS) placed at a known location determines the range and range-rate measurement errors in each received GPS signal and communicates these measurement errors as corrections to be applied by local users. The Base Station (BS) has its own imprecise clock with the clock bias $CB_{BASE}$. As a result, the local users are able to obtain more accurate navigation results relative to the base station location and the base station clock. With proper equipment, a relative accuracy of 5 meters should be possible at distances of a few hundred kilometers from the Base Station.

The differential corrections can be also obtained from the Wide Area Augmentation System (WAAS). The WAAS system includes a network of Base Stations that uses satellites (initially geostationary satellites—GEOs) to broadcast GPS integrity and correction data to GPS users. The WAAS provides a ranging signal that augments the GPS, that is the WAAS ranging signal is designed to minimize the standard GPS receiver hardware modifications. The WAAS ranging signal utilizes the GPS frequency and GPS-type of modulation, including only a Coarse/Acquisition (C/A) PRN code. In addition, the code phase timing is synchronized to GPS time to provide a ranging capability. To obtain the position solution, the WAAS satellite can be used as any other GPS satellite in satellite selection algorithm. The WAAS provides the differential corrections free of charge to a WAAS-compatible user. The accuracy of this method is less than 1 meter.

In one embodiment of the present invention, the positioning system comprises the real time kinematic (RTK) GPS system. The RTK differential GPS receiver can be used to obtain the position locations with less than 2 cm accuracy. The RTK differential GPS receiver receives the differential corrections from a Base Station placed in a known location within (10-50) km from the local user.

For the high accuracy measurement, the number of whole cycle carrier phase shifts between a particular GPS satellite and the RTK GPS receiver is resolved because at the receiver every cycle will appear the same. Thus, the RTK GPS receiver solves in real time an "integer ambiguity" problem, that is the problem of determining the number of whole cycles of the carrier satellite signal between the GPS satellite being observed and the RTK GPS receiver. Indeed, the error in one carrier cycle L1 (or L2) can change the measurement result by 19 (or 24) centimeters, which is an unacceptable error for the centimeter-level accuracy measurements.

In one embodiment of the present invention, the positioning system, comprises an Inertial Navigation System (INS) that can be built by using a combination of accelerometers, magnetometers, a processor, and a specifically designed software (not shown). Acceleron Technology, Inc., located in San Francisco, Calif., has built small light weight Inertial Navigation System (INS) using three accelerometers to measure three components of the local acceleration vector, three magnetometers to measure three components of the local gravitational vector, plus some software. An accelerometer is a sensor that measures acceleration, speed and the distance by mathematically determining acceleration over time. A magnetometer is a device that measures a local magnetic field. The local gravitational factor can be calculated by using the measured local magnetic field, because the local gravitational field, as well as the local magnetic field, are both defined by the local Earth geometry, as well explained in the book "Applied Mathematics in Integrated Navigation Systems", published by American Institute of Aeronautics and Astronautics, Inc, 2000, by Robert M. Rogers. Indeed, the "Applied Mathematics in Integrated Navigation Systems" teaches how geometrical shape and gravitational models for representing the Earth are used to provide relationship between ECEF position x-y-z components and local-level latitude, longitude, and attitude positions. The "Applied Mathematics in Integrated Navigation Systems" also teaches how a moving person/object's position change in geographical coordinates is related to the local Earth relative velocity and Earth curvature. The "Applied Mathematics in Integrated Navigation Systems" also teaches how to develop the functional characteristics of inertial sensors used in navigation systems, how to develop the time-varying dynamic error models for inertial sensors random errors. The "Applied Mathematics in Integrated Navigation Systems" is incorporated herein in its entirety.

In one embodiment of the present invention, the positioning system, comprises a pseudolite-based system. In order to make GPS signals available to receivers in locations where the true signal is being jammed, the concept of pseudolites (PLs) was invented. A pseudolite (PL) includes a PL transmitter that sends out pseudolite signals which are designed to simulate the true GPS signals from the satellites. A pseudolite (PL) allows for reception of GPS signals in those locations where the true GPS signals are being jammed.

Referring still to FIG. 1, in one embodiment of the present invention, the Positional Reality System (PRS) system 10 of FIG. 1 includes a real-time kinematic (RTK) GPS system 14 integrated with a Scanning Laser Diode Sensor (SLDS) 16, a storage memory 15 configured to store a set of data representing each real object of the real site; and 13 an imager configured to utilize the set of data stored in the storage memory in order to generate at least one Positional Reality Image (PRI) of at least one real object. (The full description of the SLDS system is given below).

In one embodiment, the Positional Reality System (PRS) system (10) of FIG. 1 is mounted on a moving platform (12 of FIG. 1). In one embodiment, the storage system (15 of FIG. 1) is implemented using a standard ORACLE database system. In one embodiment, the imager 13 of FIG. 1 is implemented by using a computer and a see-through display, or a telemonitor, or a laptop computer. The operator can view the current Positional Reality Image (PRI) on a see-through display, on a telemonitor, or on a laptop computer. (See discussion below).

The usage of the RTK GPS as a Satellite Positioning System (SATPS) allows the user to achieve the centimeter level of accuracy in the position determination of the mobile object as often as 10 times a second.

In one embodiment, the SLDS system (16) of FIG. 1 includes a rotating laser system with a scanning feature. In this embodiment, the laser beam (28) of FIG. 1 can be generated using a rotating short range laser-diode system with a scanning feature.

Rotating lasers were introduced about twenty-five years ago. The rotating laser system can be implemented when a laser spins in the horizontal plane, or Z-plane, and provide an accurate reference plane with millimeter-precision. The rotating laser emits a laser beam. The rotating laser beam can be rotated mechanically or optically. In the mechanic embodiment, the motor physically rotates the laser and accordingly the laser beam. In the optical embodiment, the mirror rotates in such a way that the physically non-rotating laser emits the rotating laser beam.

A fan (scan) laser system generates a continuously scanning laser beam in vertical plane within a certain angle window. The scanning laser beam can be scanned mechanically or optically. In the mechanic embodiment, the motor physically scans the laser and accordingly the laser beam. In the optical embodiment, the mirror scans in such a way that the physically non-scanning laser emits the scanning laser beam.

The scanning laser system can be used to measure the angular coordinates and distance from the laser scan to the target. One application is a robotics vision, another application is a collision avoidance system.

The SchwartzElectro Optics (SEQ), Orlando, Fla., manufactures scanning (fan) laser systems. Laser Systems, Inc., located in Pleasanton, Calif., manufactures a smart rotating laser system RL-S1A with a scanning feature. The user can receive the laser beam with the SmartCard target and draw the scan to any width for optimum beam brightness. This laser system has 633 nm visible diode as a laser source. The horizontal self leveling range is (+/−) 10 arc minutes. The vertical self leveling range is also (+/−) 10 arc minutes. The horizontal accuracy is (+/−) 15 arc seconds. The vertical accuracy is (+/−) 20 arc seconds. Operating range (diameter) with scanning target is 200 ft (60 m), with LS-50B receiver is 100 ft (300 m).

In one embodiment, the angular coordinates of surface of a geometrical object at the time of the illumination by the SLDS laser beam can be determined by using two conventional rotary encoders. One such encoder 60 is shown in FIG. 3. The encoder 60 employs a conventional light emitting diode/photodetector combination as described below. The encoder 60, as shown in FIG. 3A, includes a shaft 68 and an output terminal 72. The rotary encoders of FIG. 3 and FIG. 3A are manufactured by Dynamics Research Corporation.

In typical operation, the shaft 68 is attached to a device (not shown) of which it is desired to measure the rotational motion. In response to rotation of the device attached to shaft 68, output signals are generated via the output terminal 72 indicative of the motion. As known by those skilled in the art, to track this rotary motion, a disk internal to the rotary encoder 60 is provided. A typical disk 66 is shown in FIG. 3. The disk 66 is attached to the shaft 68 of the encoder so that it rotates with the shaft 68. The disk 66 is typically glass engraved via conventional IC lithography technique to include a plurality of lines 62 and 64. The arrows indicate that the lines 62 and 64 extend entirely around the circumference of the disk 66. A light emitting diode (not shown) is arranged on one side of the disk 66 and a photodetector (also not shown) is positioned on the other side. The light emitting diode/photodetector combination is fixed and does not rotate with the disk 66. As the device attached to the shaft 68 is rotated, the disk 66 also rotates and the lines 62 successively pass between the light emitting diode and photodetector inducing output signals indicative of the passing lines. Each line is equivalent to one cycle. With regard to the encoder shown in FIG. 3A, a disk of 3.5 inches in diameter can be used. Although disks can be provided with a various number of lines, the maximum number of lines available for this size and type of rotary encoder is in the range of 9000 lines (the lines 62 and 64 of FIG. 3 not being to scale). This is also referred to as the "count" of the encoder and results in a maximum of 9000 cycles per shaft revolution.

FIG. 4 shows the typical outputs for the rotary encoder 60 of FIGS. 3 and 3A. Although various output configurations can be provided, channels A and B (as well as their complementary channels) provide the primary outputs of the encoder 60 and can alternatively be generated in a sine wave form. Output A is generated by the lines 62 in FIG. 3 as described above. Output B is generated by a second light emitting diode/photodetector combination sensing a second set of lines 64 shown in FIG. 3. This second set of lines 64 is identical to the first set of lines 62 except that it is 90 degrees out of phase from the first set of lines 62. Accordingly, output B is simply output A shifted by 90 degrees or a quadrature wave form of output A. By having two output wave forms of the same frequency which are 90 degrees out of phase, it is possible to determine the direction of motion of the disk 66, and, therefore, the device attached to disk 66. This is conventionally accomplished by providing the A and B signals as the "D" and "CLOCK" inputs, respectively, of a D flip-flop. As a result, if the Q output line is high, the disk is being rotated counterclockwise. Since the output on channels A and B provide 9000 cycles per shaft revolution, one cycle can be provided every 0.04 degree of rotation.

As known by those skilled in the art, internal and/or external cycle interpolation can be added to increase the number of counts per revolution. With regard to the specific rotary encoder shown in FIG. 3A, for example, so-called external four times circuitry can be added to provide 36,000 counts per revolution, and internal ten times circuitry and external four times circuitry can be added to provide 360,000 counts per revolution. This type of circuitry, which can conventionally be added to any type of encoder, adds considerable expense and complexity to the encoder.

Referring still to FIG. 1, the first encoder of the type described as the encoder 60 of FIG. 3 can be used for measuring the horizontal angular coordinate of the surface of the geometrical object 30 and the second encoder of the type described as the encoder 60 of FIG. 3 can be used for measuring the vertical angular coordinate of the surface of the geometrical object 30.

In this embodiment, the shaft 68 of the first encoder is attached to the rotating means of the laser beacon, wherein the shaft of the second encoder is attached to the scanning means of the laser beacon. The laser beacon provides the rotating and scanning laser beam that passes the lines 62 of each encoder in one direction, wherein the reflected from the mobile unit laser beam passes the lines 62 of each encoder in the other direction and can be detected by the photodetector. As was described above, the photodetector output signals are indicative of the passing lines. For each encoder, each line is equivalent to one cycle. Thus, both encoders can be used to provide the vertical and horizontal angular coordinates of the geometrical object (30 of FIG. 1) at the time of illumination by the rotating and scanning laser beam respectively.

The distance between the laser beacon and the geometrical object (30 of FIG. 1) at the time of illumination can be determined by the simple computation. Indeed, having a clock at the laser beacon one can determine the time period that laser beam spent travelling between laser beacon and the geometrical object back and forth. Dividing this time period by two and multiplying by the speed of light, one can determine the distance between the laser beacon and each geometrical object being illuminated.

For relative measurements in the horizontal plane, there is no need for initialization. However, for absolute measurement in the horizontal plane, the user has to initialize measurement to tie the reference horizontal angle to the measured angular coordinate of each geometrical object.

In the vertical plane there is no need for initialization. However, the user should calibrate the laser beam to get a reference point in order to get rid of the system errors.

The signal processor (not shown) utilizes the data provided by optical encoders and the clock (not shown) and the time of illumination to calculate the three-dimensional coordinates for each geometrical object.

In another embodiment, the SLDS system 16 of FIG. 1 includes a scanning laser described in the U.S. Pat. No. 5,546,188 "Intelligent vehicle highway system sensor". The '188 patent is incorporated in this patent application in its entirety.

The '188 patent relates generally to object sensors and related methods. In particular, the '188 patent discloses the generation of three dimensional images of objects by rotating or scanning a laser beam rangefinder, operating at a high pulse rate, in a plane where there is relative motion between the rangefinder and the object to be sensed or imaged in a direction perpendicular to the laser beam plane of rotation. This operation causes the laser rangefinder rotating beam, when passing to a side of the object, to cover the object to be sensed with rangefinder pulses, and thereby, obtain a three dimensional image of the object.

In one embodiment, the three dimensional object sensor of patent '188 was used for the sensing trees formed in a row for purposes of spraying, counting or measuring the size of the trees. The sensor was moved along the ground traveling between rows of trees, crops or foliage with the laser rangefinder scanning on either side of the moving vehicle carrying the sensor in a plane perpendicular to the motion of the vehicle. When the sensor detected the presence of foliage, it provided a signal activating a spraying system for the efficient spraying of the tree or object being sensed.

In the preferred embodiment of '188 patent, the SLDS sensor comprises a forward and a backward beam emitted by the laser means. The forward and backward beams are separated by a predetermined angle and are emitted toward a fixed area through which the vehicle travels. A time signal representative of a travel time for a point on the vehicle to travel between the beams is determined from time-of-flight data provided by the range data processing means. A single transmitter and receiver pair is used in a preferred embodiment of the '188 patent.

In an alternate embodiment of the '188 patent, a SLDS sensor further comprises two transmitters for emitting a pair of laser beams, means for directing the beams toward zones on a roadway traveled on by the vehicle, and two receivers for converting reflected laser beams from the vehicle to signal voltages, the signal voltages representative of ranges between the receivers and defined points on the vehicle.

The '188 patent further provides for scanning of laser beams using an optically reflective surface, intercepting the beams, and reflecting the beams at predetermined angles from a perpendicular to the roadway. The beams reflected off of the vehicle are directed back toward the mirror into corresponding apertures of the receivers. Means are provided for rotatably moving the reflective surface across a reflective angle sufficient for reflecting the beams across a transverse portion of the vehicle, and signal means representative of the sensor angle within the beam plane are also provided. The angle signals are delivered to the processing means for providing range data at corresponding angles and the range and angle data in combination provide a transverse profile of the vehicle.

In one embodiment of the '188 patent, the laser beam scanning means utilizes a mirror intercepting the beam emitted from the transmitter and reflecting the beam onto scanning planes. The planes are set at opposing angles from a perpendicular to the roadway. The reflected beam directed back toward the mirror is directed into corresponding apertures of the receiver. A motor having a rotatable shaft is affixed to the mirror for continuously rotating the mirror about the axis, and an encoder is affixed to the motor shaft for identifying an angular position of the mirror relative to a reference angle.

In the preferred embodiment of the '188 patent, the processing means comprises a microprocessor programmed to receive respective range and sensor angle data for storing and processing the data for a scanned cycle associated with a timing signal. The processed data results in a three dimensional shape profile for the vehicle.

The '188 patent further discloses a scanning laser radar system to develop a range map of an area being viewed. Two dimensions are provided by the scanning pattern and a third dimension is provided by the range measurements themselves. A profile of the vehicle was determined by using range reading taken in a transverse direction across the vehicle.

The following discussion illustrates one of the embodiments that can be used to implement the Scanning Laser Diode Sensor (SLDS) (16 of FIG. 1) that is used as a short-range measuring means in the current patent application to build the Positional Reality Image (PRI) of the geometrical object (30 of FIG. 1).

More specifically, the sensor 110, as shown in FIG. 5, employs a laser transmitter 120 and optical receiver 122 having separate apertures (124 and 126 respectively) placed side-by-side. The transmitted laser beam 128 and receiver 122 field-of-view are continuously scanned by a rotating mirror 130 in a vertical plane 132 which is perpendicular to a travel axis 134 of a geometrical object 112 upon which the sensor 110 is affixed.

As shown in FIG. 5, the position of the mirror 130 and correspondingly, the laser beam 128 is determined by means of a shaft encoder 136 affixed to the mirror drive motor shaft 138. With this configuration, a single sensor 110 makes measurements of ranges between the sensor 110 and a geometrical object 114 as the sensor travels around.

As illustrated in FIG. 5A, the laser transmitter 120 utilizes a lens system and a circuitry employing a short-range diode laser 119 as an optical source.

EXAMPLE I

A conventional InGaAs strained layer quantum-well-structure injection laser 119 configured in a pulsed circuit can be used to emit 13 nanosecond pulses having a peak radiant flux of approximately thirty watts at 0.91 microns. The diode laser 119 can be driven with fifty amp current pulses generated by an avalanche-transistor pulser well known in the art. The 381 micron laser 119 diode junction emits radiation into a 10 by 40 solid angle. A fast focal length (f:0.91) multi element lens 121 having an effective focal length of, for example, on the order of 8.8 millimeters can be used to collimate the diode laser emission, resulting in a beam divergence of 46.6 miliradians parallel to the diode junction and 0.12 miliradians perpendicular to the diode junction. The collimated laser beam is expanded by a factor of six in the direction parallel to the diode junction using an anamorphic prism 123 pair resulting in a 7.8 miliradians parallel and 0.12 miliradians beam divergence for the laser beam 128 emitted through the aperture 124.

FIG. 5B illustrates an optical receiver 122 that utilizes a lens system and circuitry in order to receive an optical return radiation representing the reflected laser beam 144 incident upon the objective lens 129 and focused onto the receiver's 122 photodiode 127.

EXAMPLE II

The optical receiver 122 comprises an objective lens 129 and a silicon PIN photodiode 127 receiving the laser beam 144 at its aperture 26 after it has been reflected from the target 114. A conventional transimpedance amplifier 125 converts the photodiode current pulses to voltage pulses. Optical return radiation representing the reflected laser beam 144 incident upon the objective lens 129 is focused onto the receiver 122 photodiode 127. The receiver field-of-view is given by the ratio of the photodiode 127 diameter to the receiver lens 129 focal length and, by way of example, may be on the order of 13 miliradians. This value is sufficiently large to facilitate bore sighting the receiver 122 to the 7.8 miliradians transmitter beam width.

Referring still to FIG. 5, the shaft encoder 136 pulses the laser 119 at a preselected pulse rate. The microprocessor (150 of FIG. 5) controls the triggering of the laser transmitter 120 by sending pulse trigger signals 152 which are selected to limit the laser 120 operation to quadrants of rotation on the left and right sides.

EXAMPLE III

If the shaft encoder 136 pulses the laser 119 at a preselected pulse rate on the order of 2,048 pulses per revolution, range measurements can be made at every 3.06 miliradians about the axis 138 of the mirror rotation. With a motor 146 providing the mirror 130 rotation rate of 40 revolutions per second (rps), the laser pulse repetition rate is at 81.92 thousand cycles per second (kHz).

Referring still to FIG. 5, the sensor 110 determines a range to the target geometrical object 114 by measuring the time for one emitted pulse as it leaves the laser transmitter 120 and returns to be detected by the optical receiver 122. This round trip time is divided by two to obtain the time to travel to the target geometrical object 114 and multiplied by the speed of light, the speed of the laser beam 128. An accurate measure of the range to the target geometrical object 114 is required and thus an accurate measurement of the time is needed. To this end, the sensor system 110 includes a range measurement circuit 158. This range measurement circuit 158 is optically coupled to the laser 119 as means for initiating a start pulse for the range gate. A stop pulse for the range measurement circuit 158 is provided by a threshold detector contained within the receiver 122.

As shown in FIG. 5, the microprocessor 150 is programmed to perform sensing and calculating the shape of the geometrical objects.

As depicted in FIG. 6, the sensor (110 of FIG. 5) is used to calculate the height of the target tree 114, the range to this object, an angle 164 associated with that range, and the height 166 at which the sensor (110 of FIG. 5) is mounted above the ground 168.

The microprocessor (150 of FIG. 5) provides various outputs to light emitting diodes, and also receives inputs in addition to those described that include temperature and real time clock pulses. Backup power and circuitry is also included. Such input/output microprocessor information and backup circuitry is well known in the art.

As illustrated in FIG. 7, when the sensor 110 is scanning in the upward direction, the range 170 to the top of the tree 114 is defined as the last valid range received. The range 172 to the bottom of the tree is defined as the first valid range which produces a height above a minimum height threshold (174 of FIG. 6). When the sensor 110 is on a downward scan, the range 170 to the top of the tree 114 is defined as the first valid range received and the range 172 to the bottom of the tree 114 is defined as the last valid range which produces a height above a minimum height threshold (174 of FIG. 6). A valid range is any range less than a predetermined maximum range. Since the sensor 110 is mounted at a fixed height (166 of FIG. 6) above the ground (168 of FIG. 6), the height to the top (162 of FIG. 6) or bottom (172 of FIG. 7) of the target tree 114 can be calculated by multiplying the range measured at a given angle (164 of FIG. 6) by the sine of that angle 164 and adding the height of the sensor (166 of FIG. 6) to that product.

Thus, the height of the object can be calculated as follows:

$$\text{Height(object)} = \text{Height(sensor)} * \text{SIN(Angle)}; \qquad (1)$$

where the Range is defined to be less than a predetermined maximum range and the angle (164 of FIG. 6) takes on predetermined values between (−45) degrees and (+45) degrees.

Thus, as it is demonstrated above, the Scanning Laser Diode Sensor (SLDS) (110 of FIG. 5) has the three dimensional profile capability of measuring vectors between the SLDS location and a three dimensional point on the surface of a geometrical object at the speed of thousands measurements per second.

In one implementation, the Scanning Laser Diode Sensor (SLDS) with three dimensional profile capability has the following parameters: 200 meter range; 2 cm resolution 8 bit using a laser capable of 2 cm resolution; 30 degree dual beams with 10 degree separation.

The Latitude, Longitude and Height of the SLDS sensor mounted on a moving unit can be obtained using a SATPS system (see discussion above).

The integration of Latitude, Longitude and Height of the SLDS sensor to the laser vectors allows the user to obtain the positional information for all the laser vectors, or cloud of points that are generated, that is allows the implementation of the Positional Reality Image (PRI) of a geometrical object being scanned ('being painted').

One technique to combine each painted point with a current GPS/RTK position of the SLDS, is disclosed in the U.S. Pat. No. 5,644,318, entitled "SATPS dynamic surveying from a moving platform", which is incorporated by reference in its entirety in the current patent application.

In the '318 patent, the position-angular determination device was mounted on the targeting device that was used to sight a target. The position-angular determination device was capable of determining the coordinates (X1, Y1, Z1) of the mobile station and the angular coordinates (θ, Φ) of the normal vector to the mobile station. The position-angular determination device was also used to determine the angular coordinates (θ1, Φ1) of the target sighting line from the targeting device to the target.

If the rangefinder was known to be at a location with Cartesian coordinates (X1, Y1, Z1), if the target was known to lie at a distance R from the rangefinder, and if the rangefinder angular orientation with azimuthal angle Φ1 and polar angle θ1 relative to the X1Y1 plane in this coordinate system, the target coordinates (X2, Y2, Z2) in this system become:

$$X2 = X1 + R\,\sin(\Phi 1)\sin(\theta 1), \qquad (2)$$

$$Y2 = Y1 + R\,\cos(\Phi 1)\sin(\theta 1), \qquad (3)$$

$$Z2 = Z1 + R\,\cos(\theta 1). \qquad (4)$$

Using the above-given formulas (2-4), one can obtain relationship between each painted point (X2, Y2, Z2) and a current GPS/RTK position of the SLDS (X1, X2, X3), and therefore after combining two vectors (X1, Y1, Z1) and (X2, Y2, Z2), obtain Latitude, a Longitude and a Height for each painted point.

The data clouds (54 of FIG. 2) comprise a plurality of painted points obtained using a Positional Reality System (10 of FIG. 1) of the present invention. The point on the three dimensional real object is matched with a single three dimensional coordinate point on the three dimensional Positional Reality Image (PRI) of this geometrical object.

By viewing the three dimensional Positional Reality Image (PRI) of this geometrical object, the operator can select a three dimensional coordinate point on the three dimensional Positional Reality Image (PRI) of this geometrical object, and identify a corresponding three dimensional coordinate point of the three dimensional real object by using the matching database.

The data collection can be simplified and automated by using specialized data collection software packages comprising a data collection software package, a data processing software package, a mapping/three-dimensional viewer software package, and an object recognition software. The mapping/three-dimensional viewer software package can be implemented using a terramodel software package, or a terra vista software package. The object recognition software (CAD Models) can be used to recognize shapes from the point clouds, allowing automatic data basing of objects (highway furniture, poles, signs, etc) without operator intervention.

EXAMPLE IV

A PRS mounted on a moving vehicle travelling at 40 mph speed was used to produce a cloud of points 54 that represents a positional reality image (created with 3 seconds of data) of the geometrical object 52 (as shown in FIG. 2).

In one embodiment of the present invention, as was stated above, the optical system integrated with the positioning system further comprises a pulse-type-microlaser-based optical system configured to measure a short-to-medium range distance between the PRS system and a real site object. The telemetry device having a microlaser is disclosed in the U.S. Pat. No. 5,719,664, issued to Besesty, et al., on Feb. 17, 1998. The '664 patent is incorporated by reference herein in its entirety.

It is well known in the prior art of the laser telemetry field, for the medium and short distance application field two different types of laser sources are used.

The laser diodes are used for short distance measurements up to 100 m. These diodes are limited by their peak power (approximately 30 watts), as well as by the ocular safety standards as a result of the long pulse times (7 to 10 nanoseconds). This type of device requires the use of optics for shaping the beam emitted by the light source, a device providing protection against feedback and a switching electronics for modulating the laser beam. The Positional Reality System (PRS) of the present invention employing this type diode laser-based optical system used to measure distances from the PRS to an object placed at short distances up to 100 meters from the PRS was disclosed above in details.

Briefly, as depicted in FIG. 8, the telemetry device of '664 patent includes a passive switching microlaser 202, which delivers a light beam 214 in the direction of an object 204 of the real site. Reflected by the real site object 204, the beam 218 is directed to optical means 206 for receiving a light beam. The laser beam 219 obtained at the outlet of the reception means 206 is directed to a electronic detection circuit 210 that determines the beam transit time by generating the-end-of the interval-signal. This signal is transmitted to the time measuring device 212. The device of FIG. 8 also has means for detecting the emission time of a microlaser pulse by using a device 208 for sampling part 220 of the light flux of the beam 214 emitted by the microlaser 202, e.g. a splitting plate. In another embodiment of the device 218 (as illustrated in FIG. 9), a light beam 214 is split into two beams, a main beam 216 and a secondary beam 220, with an energy ratio between the main beam 216 and the secondary beam 220 which can be very high, e.g. exceeding 1000. This device implements both an optical beam polarization function and a signal sampling function.

The structure of a microlaser used in '664 patent (described in the article by N. Mermilliod et al. in Applied Physics Letters vol. 59, No. 27, p 3519, 1991) comprises a stack of multilayers. The active laser medium is formed by a material of limited thickness, between (150 and 1000) µm and of small size (a few mm²). The dielectric cavity mirrors are directly deposited on this stack of multilayers. The active medium is pumped by a III-V laser diode. The material of the active medium is selected from the group consisting of: {YAG ($Y_3Al_5O_{12}$), LMA (LaMg $Al_{11}O_{19}$); YLF ($YLiF_4$); YSO; and $GdVO_4$}. Another parameter is the thickness of the active medium. This thickness of the active medium determines the characteristics of the microlaser. Indeed, on one hand, the absorption of the pumping beam is higher if the thickness increases, but, on the other hand, the number of longitudinal modes of a Fabry-Perot cavity increases in proportion with the thickness of the active medium. In practice, the thickness varies between 100 µm and 5 mm. As shown in FIGS. 10A-11B, the single layer of saturable absorbent 240, (or two layers of saturable absorbent 250 and 240) is directly deposited on the solid active medium 238 in different types of cavities to absorb energy from the pumping laser beam. The microlasers obtained according to the process described in '664 in details can be of the monofrequency type, if the length of the cavity is small enough, like a few hundred micrometers. Thus, it is possible to obtain a single longitudinal mode in the gain band of the laser crystal (1 to 3 nanometers depending on the material used). The generated laser beam has a wavelength that can be tuned either by adjusting the laser chip temperature, or by adjusting the length of the cavity.

In one embodiment of the present invention, as shown in FIG. 12, the PRS system 302 obtains the database of the PRI images of the real site, transmits this database of PRI images to the Base Station (BS) 304 by using a transmitter 306 and an antenna 308. In this embodiment of the present invention, the BS 304 receives the PRI database using a transceiver 312, and an antenna 310. The BS 304 stores the database of the PRI images of the real site, and also transmits this database to a vehicle 314 equipped with the receiver 318, an antenna 316 and a PRI viewer 320. The vehicle 314 can navigate around the real site by accessing the PRI database of the real site by using the PRI viewer 320, or by using a virtual controller (not shown) in complete darkness.

In one embodiment of the present invention, the BS 304 also posts the PRI database on the Internet web site 322, and the vehicle 314 has a capability to access the PRI database posted on the Internet web site, and to navigate the real site by accessing the PRI database posted on the internet web site 322.

One aspect of the present invention is directed to a method for navigating around a real site. In one embodiment of the present invention (not shown), the method comprises the following steps: (A) creating a database of Positional Reality Images (PRI) that substantially accurately represents the real site by using the PRS system of FIG. 1; and (B) accessing the database of Positional Reality Images (PRI) in order to navigate the vehicle around the real site.

In one embodiment of the present invention (not shown), the step (A) of creating the database of Positional Reality Images (PRI) that substantially accurately represents the real site further includes the step (A1) of employing an integrated Positional Reality System (PRS) configured to create the database of Positional Reality Images (PRI) that substantially accurately represents the real site, whereas the integrated Positional Reality System (PRS) comprises a positioning system integrated with a plurality of optical systems.

In one embodiment of the present invention (not shown), the step (A1) of employing the integrated Positional Reality System (PRS) to create the database of Positional Reality Images (PRI) that substantially accurately represents the real site further comprises the following steps: (A1,1) selecting a real site object; (A1,2) estimating a range from the PRS to the selected real site object; (A1,3) selecting an optimum optical system; and (A1,4) generating a Positional Reality Image (PRI) of the selected real site object. The steps ((A1,1)-(A1,4)) are preferably repeated in order to create a database comprising a substantially complete set of Positional Reality Images (PRIs) of the real site.

In one embodiment of the present invention (not shown), the step (A1,3) of selecting the optimum optical system further includes the steps of: selecting a laser-diode-based optical scanning system if a range between the PRS and the real site object comprises a short range distance; and selecting a pulse-type-microlaser-based optical system if the range between the PRS and the real site object comprises a short-to-medium range distance.

Another aspect of the present invention is directed to a method for navigating around a real site by accessing the previously created database of Positional Reality Images (PRI) that substantially accurately represents the real site.

In one embodiment of the present invention, the method comprises the following steps (not shown): (A) creating a database of Positional Reality Images (PRI) that substantially accurately represents the real site (by using the PRS system 302 of FIG. 12); (B) accessing the database of Positional Reality Images (PRI) in order to navigate the vehicle around the real site; (C) storing the database of Positional Reality Images (PRI) that substantially accurately represents the real site; (D) transmitting the database of Positional Reality Images (PRI) that substantially accurately represents the real site from the PRS system to a base station (BS) (304 of FIG. 12); (E) transmitting the database of Positional Reality Images (PRI) that substantially accurately represents the real site from the base station (BS) into a vehicle (314 of FIG. 12); (F) viewing the database of Positional Reality Images (PRI) that substantially accurately represents the real site by an operator of the vehicle by using a viewing device (320 of FIG. 12); and (G) navigating the vehicle 314 around the real site by accessing the database of Positional Reality Images (PRI) that substantially accurately represents the real site.

In one embodiment of the present invention, the method comprises the following steps: (A) creating a database of Positional Reality Images (PRI) that substantially accurately represents the real site; (B) accessing the database of Positional Reality Images (PRI) in order to navigate the vehicle around the real site; (C) storing the database of Positional Reality Images (PRI) that substantially accurately represents the real site; and (H) posting the database of Positional Reality Images (PRI) that substantially accurately represents the real site on an Internet web site 322 of FIG. 12), so that the vehicle can navigate around the real site by accessing the posted on the web site database of Positional Reality Images (PRI)) that substantially accurately represents the real site.

In one embodiment of the present invention, the method comprises the following steps: (A) creating a database of Positional Reality Images (PRI) that substantially accurately represents the real site; (B) accessing the database of Positional Reality Images (PRI) in order to navigate the vehicle around the real site; (C) storing the database of Positional Reality Images (PRI) that substantially accurately represents the real site; and (I) web casting the database of Positional Reality Images (PRI) that substantially accurately represents the real site from the Internet web site, so that the vehicle can navigate around the real site by accessing the posted on the web site database of Positional Reality Images (PRI)) that substantially accurately represents the real site.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for navigating a vehicle around a real site comprising the steps of:
   (A) creating a database of Positional Reality Images (PRI) that substantially accurately represents said real site; said real site comprising at least one three dimensional real geometrical object; each said Positional Reality Image (PRI) substantially accurately represents at least one three dimensional real geometrical object of said real site;
   and
   (B) accessing said database of Positional Reality Images (PRI) that substantially accurately represents said real site in order to navigate said vehicle around said real site.

2. The method of claim 1, wherein said step (A) of creating said database of Positional Reality Images (PRI) that substantially accurately represents said real site further includes the step of:
   (A1) employing an integrated Positional Reality System (PRS) configured to create said database of Positional Reality Images (PRI) that substantially accurately represents said real site; said integrated Positional Reality System (PRS) comprising a positioning system integrated with a plurality of optical systems.

3. The method of claim 2, wherein said step (A1) of employing said integrated Positional Reality System (PRS) configured to create said database of Positional Reality Images (PRI) that substantially accurately represents said real site further comprises the steps of:
   (A1, 1) selecting a real site object;
   (A1, 2) estimating a range from said PRS to said selected real site object;
   (A1, 3) selecting an optimum optical system;
   (A1, 4) generating a Positional Reality Image (PRI) of said selected real site object;
   and
   (A1, 5) repeating said steps ((A1, 1)-(A1, 4)) in order to create a database comprising a substantially complete set of Positional Reality Images (PRIs) of said real site.

4. The method of claim 3, wherein said step (A1, 3) of selecting said optimum optical system further includes the steps of:
   selecting a laser-diode-based optical scanning system if a range between said PRS and said real site object comprises a short range distance;
   and
   selecting a pulse-type-microlaser-based optical system if said range between said PRS and said real site object comprises a short-to-medium range distance.

5. The method of claim 1, wherein said step (B) of accessing said database of Positional Reality Images (PRI) that accurately represents said real site in order to navigate said vehicle around said real site further comprises the step of:
   (B1,1) viewing said database comprising said substantially complete set of Positional Reality Images of said real site.

6. The method of claim 5, wherein said vehicle is equipped with said PRS, further including the step of:
   (B1, 2) navigating said vehicle around said real site.

7. The method of claim 5, wherein said vehicle is equipped with said PRS, further including the step of:
(B1, 3) navigating said vehicle around said real site in real time.

8. The method of claim 5, wherein said vehicle is equipped with said PRS, further including the step of:
(B1, 4) navigating said vehicle around said real site in complete darkness.

9. The method of claim 1 further comprising the step of:
(C) storing said database of Positional Reality Images (PRI) that substantially accurately represents said real site.

10. The method of claim 1 further comprising the step of:
(D) transmitting said database of Positional Reality Images (PRI) that substantially accurately represents said real site from said PRS system to a base station (BS).

11. The method of claim 10 further comprising the steps of:
(E) transmitting said database of Positional Reality Images (PRI) that substantially accurately represents said real site from said base station (BS) into a vehicle;
(F) viewing said database of Positional Reality Images (PRI) that substantially accurately represents said real site by an operator of said vehicle;
and
(G) navigating said vehicle around said real site by accessing said database of Positional Reality Images (PRI) that substantially accurately represents said real site.

12. The method of claim 10, wherein said step (G) of navigating said vehicle around said real site by accessing said database of Positional Reality Images (PRI) that substantially accurately represents said real site further comprises the step of:
(G1) navigating said vehicle around said real site in complete darkness.

13. The method of claim 10 further comprising the step of:
(H) posting said database of Positional Reality Images (PRI) that substantially accurately represents said real site on an Internet web site.

14. The method of claim 13 further including the step of:
(I) web casting said database of Positional Reality Images (PRI) that substantially accurately represents said real site from said Internet web site.

15. An apparatus for navigating a vehicle around a real site, said apparatus comprising:
an integrated Positional Reality System (PRS) mounted on a moving platform; said integrated Positional Reality System (PRS) further comprising:
a positioning system;
and
a plurality of optical systems integrated with said positioning system; wherein said Positional Reality System (PRS) is configured to create a plurality of Positional Reality Images (PRIs) of said real site; wherein each said PRI image represents at least one real object located at said real site.

16. The apparatus of claim 15, wherein said plurality of optical systems integrated with said positioning system further comprises:
a laser-diode-based optical scanning system configured to measure a short range distance between said PRS system and a real site object;
and
a pulse-type-microlaser-based optical system configured to measure a short-to-medium range distance between said PRS system and a real site object.

17. The apparatus of claim 15 further comprising:
a see-through display.

18. The apparatus of claim 15 further comprising:
a telemonitor.

19. The apparatus of claim 15 further comprising:
a storage means for storing a database of PRI images of said real site.

20. The apparatus of claim 15 further comprising:
a transceiver configured to wirelessly transmit said database of PRI images of said real site to a Base Station (BS).

21. The apparatus of claim 15 further comprising:
a transceiver configured to wirelessly receive said database of PRI images of said real site from said BS.

22. The apparatus of claim 15 further comprising:
a transceiver configured to wirelessly receive said database of PRI images of said real site from a web site.

23. The apparatus of claim 15 further comprising:
a virtual controller configured to get access to said database of said set of PRI images of said real site.

24. The apparatus of said claim 15, wherein said positioning system is selected from the group consisting of: {a Satellite Positioning System (SATPS); a GALILEO system; a GPS system; a differential DGPS system; a real time kinematic RTK GPS system; a combined GLONASS/GPS system; a combined GALILEO/GPS system; an inertial navigation system (INS); and a pseudolite navigation system}.

* * * * *